Aug. 28, 1934.                F. MAMAY                1,971,689
                             ORANGE KNIFE
                          Filed May 27, 1933
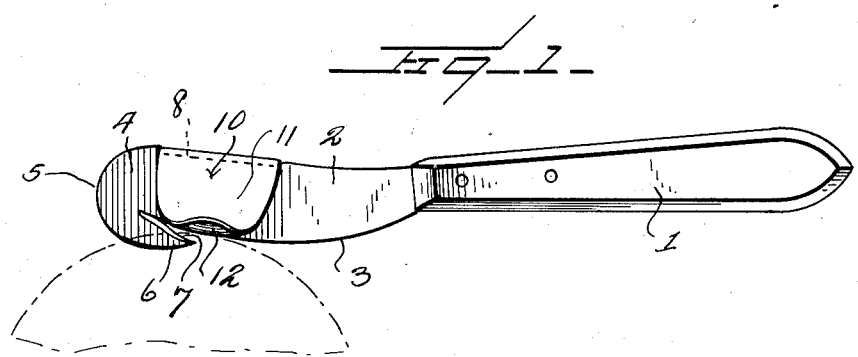
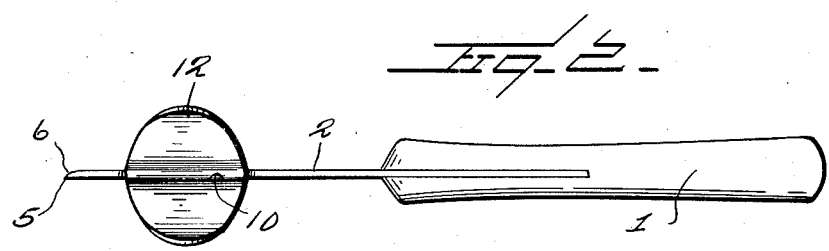
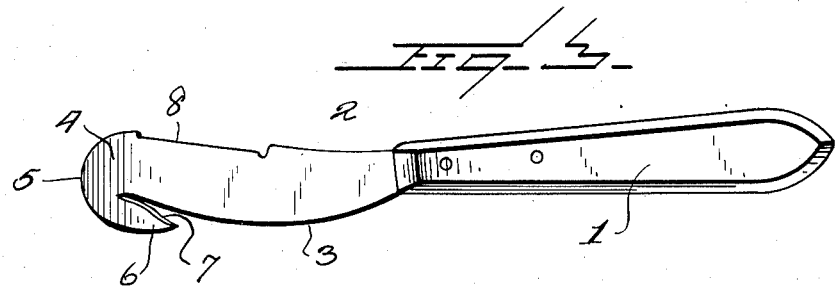
Inventor
Fredrick Mamay
By Watson E. Coleman
          Attorney Patented Aug. 28, 1934

1,971,689

UNITED STATES PATENT OFFICE 1,971,689

ORANGE KNIFE

Fredrick Mamay, Glenwood Springs, Colo.

Application May 27, 1933, Serial No. 673,298

2 Claims. (Cl. 146—3)

This invention relates to improvements in the class of cutlery and pertains particularly to an improved orange knife.

The primary object of the present invention is to provide an orange knife which is designed to slit or cut the skin of the orange without cutting into the meaty or fleshy part thereof, so that the skin may be completely removed without damaging the thin under skin which covers the inner meaty sections.

A further object of the invention is to provide an orange peel slitting knife which has associated therewith means to prevent the scattering or flying of the oil in the skin as the oil cells are cut into.

A still further object of the invention is to provide an orange skin slitting knife having a detachable unit associated therewith which is provided with lateral wings which overlie the surface of the skin immediately surrounding the portion being cut and prevent the oil from being forcibly ejected as the oil cells are cut.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of the knife embodying the present invention showing the oil shield attached thereto;

Figure 2 is a view in top plan of the same;

Figure 3 is a view in side elevation of the knife with the oil shield removed;

Figure 4 is a view in perspective of the oil shield, per se.

Referring now more particularly to the drawing wherein like numerals of reference indicate corresponding parts throughout the several views, the numeral 1 indicates the handle of the present knife, while the blade thereof is indicated by the numeral 2.

The blade 2 has its front edge of longitudinally arcuate formation as indicated at 3 and at the forward end the blade is formed to provide a head 4 which has a rounded forward edge 5 which is of reduced thickness as indicated at 6 in Figure 2 to facilitate its introduction under the skin of the orange after the same has been slit so that the latter may be conveniently forced away from the body of the fruit.

As shown in Figures 1 and 3 the head is of greater width than the major portion of the body of the blade and is extended beneath the edge 3 to form the rearwardly directed penetrating point 6, the inner edge of which is sharpened as indicated at 7.

The back edge of the blade 2 adjacent the forward end, is cut out or recessed as indicated at 8 to receive the fold portion 9 of the shield unit which is indicated as a whole by the numeral 10. This shield unit comprises a metal plate which is bent transversely intermediate its ends to form the fold 9 and the side walls 11 and each end is then turned laterally to form the oppositely extending wings 12 which overlie the surface of the fruit when the knife is in use.

The shield unit 10 is placed on the blade to straddle the same as shown in Figure 2 and, as previously stated, the fold portion 9 seats in the recess 8 and is thus prevented from moving longitudinally on the blade. The walls 11 of the shield are placed sufficiently close together to tightly frictionally engage the blade 2 so that the shield will not be forced off of the same when the knife is in use. In order to further assure the shield staying in place the forefinger of the hand holding the knife may be applied to the fold portion of the shield as the knife is being drawn across the surface of the fruit.

From the foregoing it will be readily apparent that with a knife of the character herein described, the cutting point 6, being spaced the proper distance from the guard edge 3 of the blade, will penetrate only sufficiently deeply into the skin to slice the same without injuring the underlying meat and with the shield unit 10 in place the oil of the skin will not be discharged over the person using the knife as the oil cells are cut into.

Having thus described the invention, what is claimed is:—

1. A knife of the character described, comprising a blade having a longitudinally arcuate edge portion, a head at one end of the blade, a pointed tongue integral with said head and extending away therefrom and having a sharpened edge in spaced relation with a portion of said arcuate edge, and a shield unit carried by the blade and comprising a pair of spaced bodies connected together and having said blade frictionally engaged therebetween and further having lateral terminal portions constituting wings which are adapted to overlie an area of a body of fruit in which the said tongue is engaged.

2. A fruit skin slitting knife, comprising a blade, a handle at one end of the blade, a pointed blade integral with the first blade adjacent the opposite end from the handle and having a cutting edge extending at an angle to an edge of the first blade in opposed relation thereto and directed toward the handle end thereof, said first blade having a recess formed in the back edge opposite the edge adjacent the cutting edge of the second blade, and a substantially V-shaped guard member frictionally engaging over the first blade and positioning in said recess, said V-shaped guard member having the free ends of the side portion thereof extending laterally in opposite directions to form shields overlying the skin of the fruit into which the cutting blade is extended.

FREDRICK MAMAY.